United States Patent [19] [11] 4,198,655
Coulomb [45] Apr. 15, 1980

[54] SYSTEMS FOR THE DISPLAY AND INDICATION OF INFORMATION

[75] Inventor: Pierre Coulomb, Fontenay sous Bois, France

[73] Assignee: Societe Francaise d'Equipements pour la Navigation Aerienne, Velizy-Villacoublay, France

[21] Appl. No.: 706,016

[22] Filed: Jul. 16, 1976

[30] Foreign Application Priority Data

Feb. 18, 1975 [FR] France .................................. 75-22604
Feb. 17, 1976 [FR] France ................................ 76 04355

[51] Int. Cl.² .............................................. H04N 7/18
[52] U.S. Cl. .................................... 358/109; 358/240; 358/241; 358/901; 35/12 B; 35/12 N; 343/6 TV
[58] Field of Search ............... 358/103, 108, 109, 200, 358/240, 241, 901, 230, 250; 343/6 TV; 350/96.13, 96.14; 35/12 B, 12 N, 10.2

[56] References Cited

U.S. PATENT DOCUMENTS

| | | | |
|---|---|---|---|
| 3,446,916 | 5/1969 | Abel et al. | 358/901 |
| 3,663,112 | 5/1972 | James | 356/251 |
| 3,824,535 | 7/1974 | Rover, Jr. | 358/250 |
| 3,885,095 | 5/1975 | Wolfsom | 358/109 |
| 3,915,548 | 10/1975 | Opittek, et al. | 358/250 |

Primary Examiner—Robert L. Griffin
Assistant Examiner—Edward L. Coles
Attorney, Agent, or Firm—Scully, Scott, Murphy & Presser

[57] ABSTRACT

A device for the display and indication of information of various types and coming from various sources, in particular for an aircraft or the like. The system comprises a converter for transforming the information into at least one video signal representative of an image related to the information, transfer means for remotely transmitting the video signal, means for forming an image from the video signal emanating from the transfer means, and a projection apparatus such as a lens for projecting the image onto a screen.

3 Claims, 6 Drawing Figures

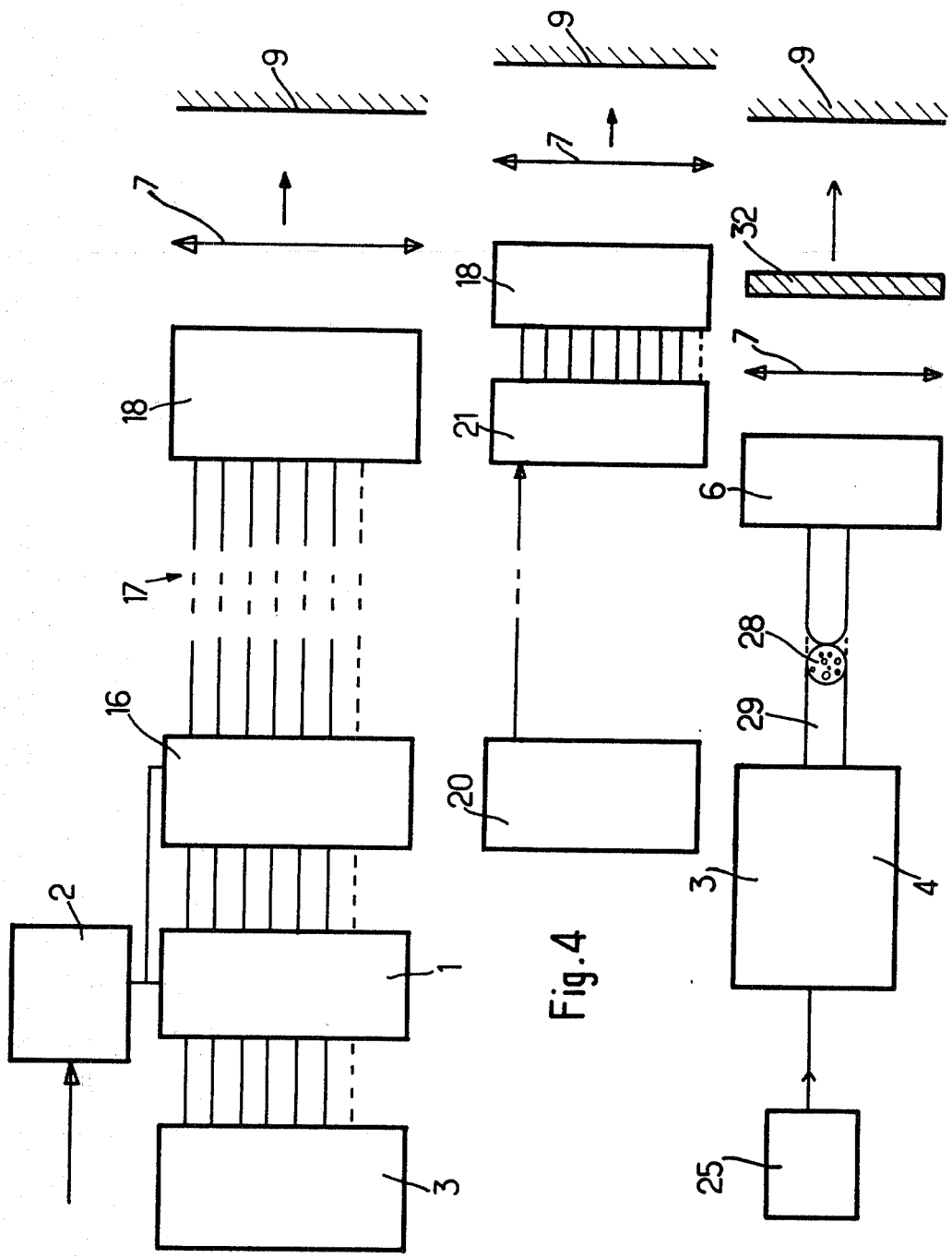

SYSTEMS FOR THE DISPLAY AND INDICATION OF INFORMATION

The present invention relates to a display and indication system which is able to serve particularly, but not exclusively, as a head up flight control device for guiding an aircraft on the runway, at the time of take-off or landing.

More particularly, it relates to the realisation of a system which is able to provide the pilot of an aircraft with visual information, without the pilot being forced to interrupt his external vision and on the other hand, to this end, to provide a device which may be housed in the free space remaining in the pilot's cabin and in particular behind the pilot's instrument panel.

It is obvious that such a display system has numerous advantages, particularly in the case of guiding an aircraft on the runway, at the time of take-off or landing.

Generally, during take-off or landing, the man who pilots an aircraft uses visual references of the outside world for keeping his aircraft as close as possible to the central line of the runway.

In poor visibility, (i.e. for horizontal visibility less than 200 meters), visual references of the outside world may become momentarily or definitely insufficient for this visual guidance. The user requires emergency means for overcoming this shortage of references in the outside world: a shortage which may occur suddenly during taxiing, when a patch of fog covers the runway.

A certain number of solutions have been proposed for providing this emergency means. However, none of these solutions have been able to provide the results anticipated, since they all have drawbacks.

these drawbacks generally consist in that:

the systems proposed are generally too complex and therefore too expensive and unreliable in view of the infrequent use made of the latter (1 to 3% of flights);

the systems proposed are generally heavy and bulky, which frequently causes:

a disadvantageous limitation of the pilot's field of vision, even at times when the guidance method is not in use (method using peripheral vision);

discomfort for the pilot when the guidance method is being used (method using a removable collimator);

inadmissible overcrowding of the instrument panel or even of the space available on the cockpit ceiling (all methods);

considerable danger of injury to the pilot in the case of impact (all methods);

impossibility of integration in a standard cockpit owing to the large dimensions of the apparatus (head up device).

A first object which the invention sought to achieve was initially the realisation of a system which is able to provide the pilot with information facilitating guidance of the aircraft if there were a shortage of visual references during taxiing and without the pilot having to interrupt his outside vision.

To this end, the invention proposes to use the windscreen of the aircraft both as a display and indication zone. In this regard, it should be stated that the windscreen of the aircraft which constitutes a priviledged display zone owing to its dimensions and situation along the axis of the pilot's field of vision, may be used for this purpose for most configurations, whether on the ground, during take-off or landing or even during aircraft manoeuvres on the ground.

This is the reason why the invention is not limited to pure and simple guidance of an aircraft, but also relates to the display of information of very varied nature, which may be very useful to the pilot whilst flying the aircraft, for example the display, at the pilot's request, of instructions from the flight manual corresponding to a particular situation of the aircraft.

Consequently, the information which may be used by the display system according to the invention may come from multiple sources and should be able to be selected as the pilot wishes. For example, this information may consists of data which has been previously memorised, measurement signals, differential signals etc. Their nature may also be very varied (numerical or analog electrical signals, or even mechanical signals such as a displacement of a moving part).

To achieve these results, the display and indication system according to the invention essentially comprises a converter making it possible to transform said information into at least one video signal i.e. a signal directly or indirectly representative of an image, a transfer member for the remote transmission of said video signal, a member for forming an image from said video signal and a projection apparatus for projecting the image produced by said forming member on the wind-screen of the aircraft or possibly on a removable screen momentarily located on said windscreen.

Embodiments of the invention will be described hereafter as non-limiting examples, referring to the accompanying drawings in which:

FIG. 3 is a block diagram of a display system in which the video signal is not an optical signal and is directly representative fo the image and must consequently be transformed;

FIG. 4 is a block diragram of an application of the display system according to the invention, to a head up control device of an aircraft;

FIG. 5 is a partial longitudinal section of the front part of the cabin of an aircraft equipped with a display system according to the invention.

Figure 1:
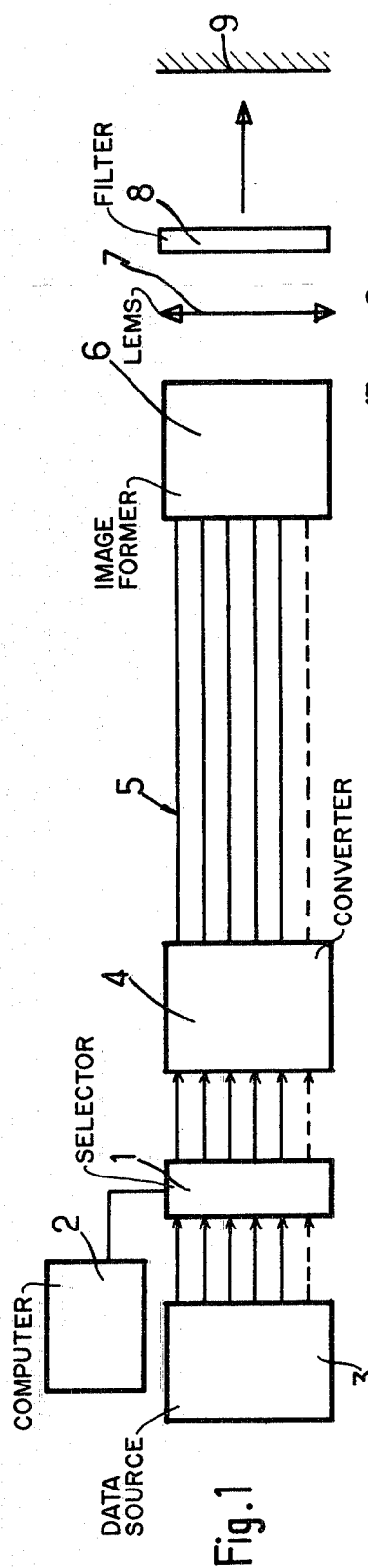
FIG. 1 is a theoretical block diagram making it possible to illustrate the principle of a display and indication system in which the video signal is an optical signal.

With reference to FIG. 1 the display and indication system firstly comprises a device 1 for the selection and possible processing of information, controlled by a computer 2 according to the pilot's wish and which receives a plurality of information such as data which has been previously memorised, measurement signals, differential signals etc emanating from the block 3.

This selection device 1 is intended to transmit the selected information coming from the block 3, after possible processing, to a converter 4 which transforms this information into luminous video signals which may or may not be directly representative of the image which it is desired to obtain. These signals are transmitted remotely by means of a transfer member 5 to a member 6 for forming the image associated with projection means (lens 7 and filter 8) which projects the image on the wind-screen 9. In this respect, it will be noted that the arrangement constituted by the member 6 for forming the image and the projection apparatus may be advantageously located behind the pilot's instrument panel. On the other hand, the remainder of the apparatus may be conveniently located in a part of the cabin (or close to the latter) which is less congested.

Figure 2:
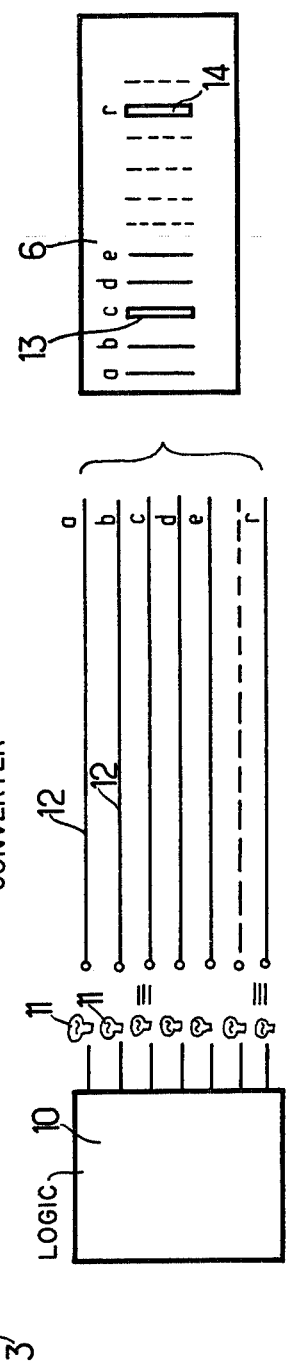
FIG. 2 shows diagramatically a method of transfer of the optical video signal, namely the transfer of a signal which is not directly representative of the image and which must consequently be transformed (FIG. 2)

With reference to FIG. 2, the converter 4 which transforms the information emanating from the block 1 into (luminous) video signals comprises a logic member 10 which transforms said information into luminous digital signals by means of a succession of light sources 11. Associated with each of these light sources 11 which corresponds to predetermined information, is a bunch 12 of optical fibres, which thus transmit the light signal to the member for forming the image 6. In the example shown in FIG. 2, formation of the image is obtained by distributing the ends of the optical fibres of each of the bunches 12 in the form of a rod 13, the arrangement of rods constituting a ladder. The luminous video signal is therefore transformed to obtain an image. It should also be noted that this image may consist of an arrangement other than a ladder. For instance, it could consist of numbers or letters. It could also possibly undergo changes of colour.

In the example illustrated in FIG. 2, to transmit information representative of a magnitude, it is necessary that the image comprises two illuminated graduations, namely a reference graduation 14 and a graduation spaced apart from the graduation 13 by an interval proportional to said magnitude.

It sould be noted that the video signal provided by the converter 4 could consist of the image itself (for example obtained from microfilm, by means of a projector) and consequently the transfer of this image to the projection member could be achieved by means of conventional optical transmission systems (using optical fibres, reflectors etc . . . ).

In the preceding examples, the video signal transmitted by the converter 4 was an optical signal. Naturally, this signal could be of any other type.

For example, it could consist of an electrical digital signal directly or indirectly representative of the image.

Thus, in the example illustrated in FIG. 3, the signals supplied by the selection device 1 are transmitted to an information-processing system 16, for example a logic member which transforms them into digital video signals directly representative of the image. These signals are transmitted by means of an arrangement of leads 17 to the member 18 for forming the image. It will be noted that the video signals emanating from the information-processing system 16 could be coded (block 20, FIG. 4) and require only a minimum of leads for their transmission, these signals having to be decoded (block 21) before the formation of the image.

The formation of the image from electrical signals transmitted by the transmission member and which are possibly decoded, may take place in many ways, depending on the nature of the image which it is desired to obtain.

By way of example, this formation of the image could be achieved by means of electro-luminescent diodes.

However, it should be noted that one of the most advantageous means of effecting this formation consists of using liquid crystals. In fact, it is known that one of the essential properties of certain of these liquid crystals consists in that it is possible to change their state of polarisation when they are placed in the presence of an electric field. Consequently, if such crystals are placed between a polarizer and an analyser having a suitable orientation and the arrangment is illuminated by means of a light source, transmission of light will take place only if an electrical field is created inside the liquid crystal. The advantage of this type of formation of signal is that it is possible to place a message on each of the crystals. Furthermore, it is possible to produce arrangements of liquid crystal cells having a matrix-like configuration, such that by appropriate processing of the electrical video signals, it is possible to produce or reproduce images whatever their shapes.

To facilitate better vision of the image projected on the wind-screen, it is preferable to treat the latter so as to obtain an increase in the coefficient of reflections and this is without impairing the coefficient of transmission.

Moreover, it is possible to provide a removable screen placed in front of the aircraft wind-screen, inside the cabin, so that it is possible to project the image no longer onto the wind-screen, but on to this screen, in the case where the aircraft is facing into the sun and consequently the image projected on the screen is not distinguishable. In this respect, it should be noted that the use of a screen in front of the wind-screen does not constitute a hindrance for flying the aircraft owing to the fact that vision through the wind-screen is useful only during very short periods of time and during these periods it is possible to remove the screen.

It is also important to note that when one desires to see the image on the wind-screen and to see outside, through the wind-screen, it is preferable to project the image obtained by the forming member to infinity.

With reference to FIG. 5, the head up flight control device uses electrical signals already processed by an automatic pilot or conventional flight control device (block 25) and transforms them pseudo-statically into a movable light symbol, infinitely visible by the pilot after projection on the wind-screen 9 of the aircraft.

The block 25 is not actually part of the invention. It recalls the origin and nature of the signals used, i.e. continuous current analog signals or all or nothing breakdown signals.

The electrical signals provided by the block 25 are transmitted to a converter 4 for converting the electrical signal into an optical signal.

This converter may comprise in succession:

electronic circuits, for example for digital analog conversion, for the amplification of power and possible decoding the digital signal;

miniature lamps or a moving arrangement comprising a light source and finally;

receptacles for emission towards the optical fibres 28 of a bunch 29.

The converter 4 may be located in a small casing, of standard or non-standard dimensions and which may be installed in electronic cabinets some distance from the pilot's instrument panel.

The signals channelled in the optical fibres 28 are transmitted to a member 6 for forming an image, which comprises a light-emitting face, produced by an adequate arrangement of the ends of optical fibres 28 of the bunch 29. In this respect, it will be noted that the optical symbols generated may be very varied: their shape, colour and number are not limited by the method used.

The member 6 for forming an image is associated with an optical system 7 (lens) which may be constituted for example by at least one appropriate lens 31 (FIG. 6) collimating said emitting side to infinity. This optical system should have the largest possible aperture compatible with the installation constraints in order to ensure the pilot the largest possible field of vision.

In order to eliminate parasite reflections of the outside light on the front sides of the afore-described optical system 7, the latter may comprise a system of optical filters 32 which may also serve to reduce the spectrum of the light emitted.

Figure 6:
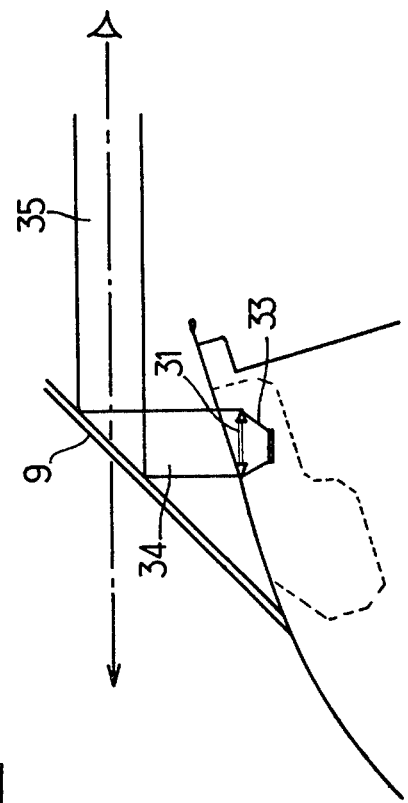
FIG. 6 shows the arrangement of a suitable optical system.

With reference to FIG. 6, the casing 33 containing the arrangement constituted by the forming member 6, the optical system 7 and the filters 32 is countersunk owing to its reduced dimensions and is therefore invisible to the pilot. The installation of the casing 33 must be undertaken with great care in order to ensure suitable channelling for the optical beam 34. Generally, the beam emitted is virtually vertical and directed upwards.

FIG. 6 shows particularly clearly channelling of the beam 34 emitted and reflection on the wind-screen 9 such that the reflected beam 35 is in the normal field of vision of the pilot. This reflection on the wind-screen may be improved by a special treatment of the wind-screen 9 in order to ensure greater efficiency of the reflected light energy and elimination of the double image effect on the outer side of the wind-screen 9.

It will be clear that the symbols used depend on the operational use of the device and the pilot's requirements as regards vision.

In this respect, it will be noted that the ergonomics of the system may give rise to various practical solutions which will not be described.

What is claimed is:

1. A system for the projection on the windshield of a vehicle images representative of information, this system comprising:
    a converter means for transforming said information into luminous digital signals transmitted by a succession of discrete luminous sources;
    a series of bundles of optic fibers in which the end receivers of each one of the bundles can be illuminated by a corresponding luminous source;
    an image-forming means representative of said information, comprising an arrangement of end transmitters of the bundles of optic fibers; and
    a lens collimated to infinity for projecting said image on the windshield of the vehicle.

2. A system according to claim 1, in which the ends of each of the bundles of optic fibers are arranged in such a manner as to form a rod, the group of rods forming a ladder.

3. A system according to claim 1, wherein the image formed by said image-forming means comprises two graduations, a fixed graduation of reference and a mobile graduation, of which the distance to said fixed graduation is representative of the aforesaid information.

* * * * *